United States Patent
Pelouch et al.

(10) Patent No.: US 9,735,532 B2
(45) Date of Patent: Aug. 15, 2017

(54) MULTI-SPAN OPTICAL COMMUNICATIONS LINK HAVING REMOTE OPTICALLY PUMPED AMPLIFIER

(71) Applicant: Xtera Communications, Inc., Allen, TX (US)

(72) Inventors: Wayne S. Pelouch, McKinney, TX (US); Do-Il Chang, Allen, TX (US)

(73) Assignee: Neptune Subsea IP Limited, London (GB)

(*) Notice: Subject to any disclaimer, the term of this patent is extended or adjusted under 35 U.S.C. 154(b) by 0 days.

(21) Appl. No.: 14/638,651

(22) Filed: Mar. 4, 2015

(65) Prior Publication Data

US 2015/0270676 A1 Sep. 24, 2015

Related U.S. Application Data

(60) Provisional application No. 61/955,486, filed on Mar. 19, 2014.

(51) Int. Cl.
*H01S 3/30* (2006.01)
*H01S 3/067* (2006.01)
(Continued)

(52) U.S. Cl.
CPC .......... *H01S 3/06754* (2013.01); *H01S 3/302* (2013.01); *H04B 10/2916* (2013.01)

(58) Field of Classification Search
CPC .. H01S 3/302; H01S 3/06754; H04B 10/2916
See application file for complete search history.

(56) References Cited

U.S. PATENT DOCUMENTS

| 5,917,648 A | * | 6/1999 | Harker | H01S 3/06704 |
| | | | | 359/333 |
| 6,081,366 A | * | 6/2000 | Kidorf | G03F 7/0045 |
| | | | | 359/334 |

(Continued)

FOREIGN PATENT DOCUMENTS

EP 1460737 9/2004

OTHER PUBLICATIONS

PCT/US2015/018780, Notification of Transmittal of the International Search Report and the Written Opinion of the International Searching Authority, or Declaration dated May 27, 2015. (12 pages).

*Primary Examiner* — Eric Bolda

(57) ABSTRACT

A remote optically pumped amplifier in a multi-span optical communications link. A backwards Raman pump module performs backwards Raman amplification in an optical communications span that contains the remote optically pumped amplifier. A residual amount of backwards Raman pump power is then used to power the remote optically pumped amplifier. The remote optically pumped amplifier may be located 40 to 120 kilometers in optical distance from the backwards Raman pump module such that at least three milliwatts of residual Raman pump power is received by the remote optically pumped amplifier. The Raman pump module may be a multi-pump Raman pump module. A controller controls pump power provided by at least one of the pumps of the backwards Raman pump module, so as to at least partially compensate for optical signal strength versus wavelength variation introduced by the remote optically pumped amplifier and the backwards Raman pump module.

20 Claims, 3 Drawing Sheets

(51) Int. Cl.
*H04B 10/29* (2013.01)
*H04B 10/291* (2013.01)

(56) References Cited

U.S. PATENT DOCUMENTS

| | | | | |
|---|---|---|---|---|
| 6,292,288 | B1* | 9/2001 | Akasaka | H01S 3/06754 359/334 |
| 6,323,993 | B1* | 11/2001 | Hansen | H04B 10/2543 359/337 |
| 2002/0048062 | A1* | 4/2002 | Sakamoto | H04B 10/0775 398/30 |
| 2002/0109906 | A1* | 8/2002 | Grubb | H01S 3/302 359/334 |
| 2003/0234974 | A1* | 12/2003 | Evans | H01S 3/06758 359/337.1 |
| 2004/0109655 | A1* | 6/2004 | Dennis | H04B 10/25253 385/123 |
| 2004/0196532 | A1 | 10/2004 | Evangelides, Jr. et al. | |
| 2006/0209394 | A1* | 9/2006 | Papernyi | H04B 10/291 359/341.33 |
| 2007/0003286 | A1* | 1/2007 | Masuda | H04B 10/291 398/92 |
| 2008/0074734 | A1* | 3/2008 | Nissov | H01S 3/06758 359/337 |
| 2008/0152352 | A1* | 6/2008 | Papernyi | H04B 10/2918 398/157 |
| 2009/0285584 | A1 | 11/2009 | Fevrier et al. | |
| 2010/0183305 | A1* | 7/2010 | Chang | H01S 3/06758 398/67 |
| 2010/0209110 | A1* | 8/2010 | Pelouch | H04B 10/2916 398/92 |
| 2010/0209117 | A1* | 8/2010 | Chang | H04B 10/2935 398/175 |
| 2012/0033293 | A1 | 2/2012 | Zaacks et al. | |

* cited by examiner

MULTI-SPAN OPTICAL COMMUNICATIONS LINK HAVING REMOTE OPTICALLY PUMPED AMPLIFIER

CROSS-REFERENCE TO RELATED APPLICATIONS

This application claims priority to U.S. provisional application Ser. No. 61/955,486 filed Mar. 19, 2014, which provisional patent application is incorporated herein by reference in its entirety.

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optical signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

BRIEF SUMMARY

At least one embodiment described herein relates to the use of a remote optically pumped amplifier in a multi-span optical communications link. A backwards Raman pump module performs backwards Raman amplification in the optical communications span that contains the remote optically pumped amplifier. A residual amount of backwards Raman pump power is then used to power the remote optically pumped amplifier. The remote optically pumped amplifier may be located 40 to 120 kilometers in optical distance from the backwards Raman pump module such that at least three milliwatts of residual Raman pump power is received by the remote optically pumped amplifier. The Raman pump module may be a multi-pump Raman pump module. The optical communications link may be a terrestrial optical communications link in which the remote optically pumped amplifier is positioned in a splice protector box or other enclosure.

There may be multiple optical communications spans in the optical communications link that similarly contain a remote optically pumped amplifier that is powered by a backwards Raman pump module. A controller might control an amount of pump power provided by at least one of the pumps of the backwards Raman pump module, so as to at least partially compensate for optical signal strength versus wavelength variation introduced by the remote optically pumped amplifier and the backwards Raman pump module. The control may be based on a measure of the optical signal power versus wavelength variation at or proximate the backwards Raman pump module or downstream of the backwards Raman pump module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Although the principles described herein are not limited to embodiments that have the advantages that will now be described, some embodiments described herein relate to a remote optically pumped amplifier in a multi-span optical communications link. A backwards Raman pump module performs backwards Raman amplification in the optical communications span that contains the remote optically pumped amplifier. A residual amount of backwards Raman pump power is then used to power the remote optically pumped amplifier. The remote optically pumped amplifier may be located 40 to 120 kilometers in optical distance from the backwards Raman pump module such that at least three milliwatts of residual Raman pump power is received by the remote optically pumped amplifier. The Raman pump module may be a multi-pump Raman pump module. The optical communications link may be a terrestrial optical communications link in which the remote optically pumped amplifier is positioned in a splice protector box or other enclosure.

There may be multiple optical communications spans in one communications link that similarly contain a remote optically pumped amplifier that is powered by a backwards Raman pump module. A controller might control an amount of pump power provided by at least one of the pumps of the backwards Raman pump module, so as to at least partially compensate for optical signal strength versus wavelength variation introduced by the remote optically pumped amplifier and the backwards Raman pump module. The control may be based on a measure of the optical signal power versus wavelength variation at or proximate the backwards Raman pump module or downstream of the backwards Raman pump module.

Figure 1:
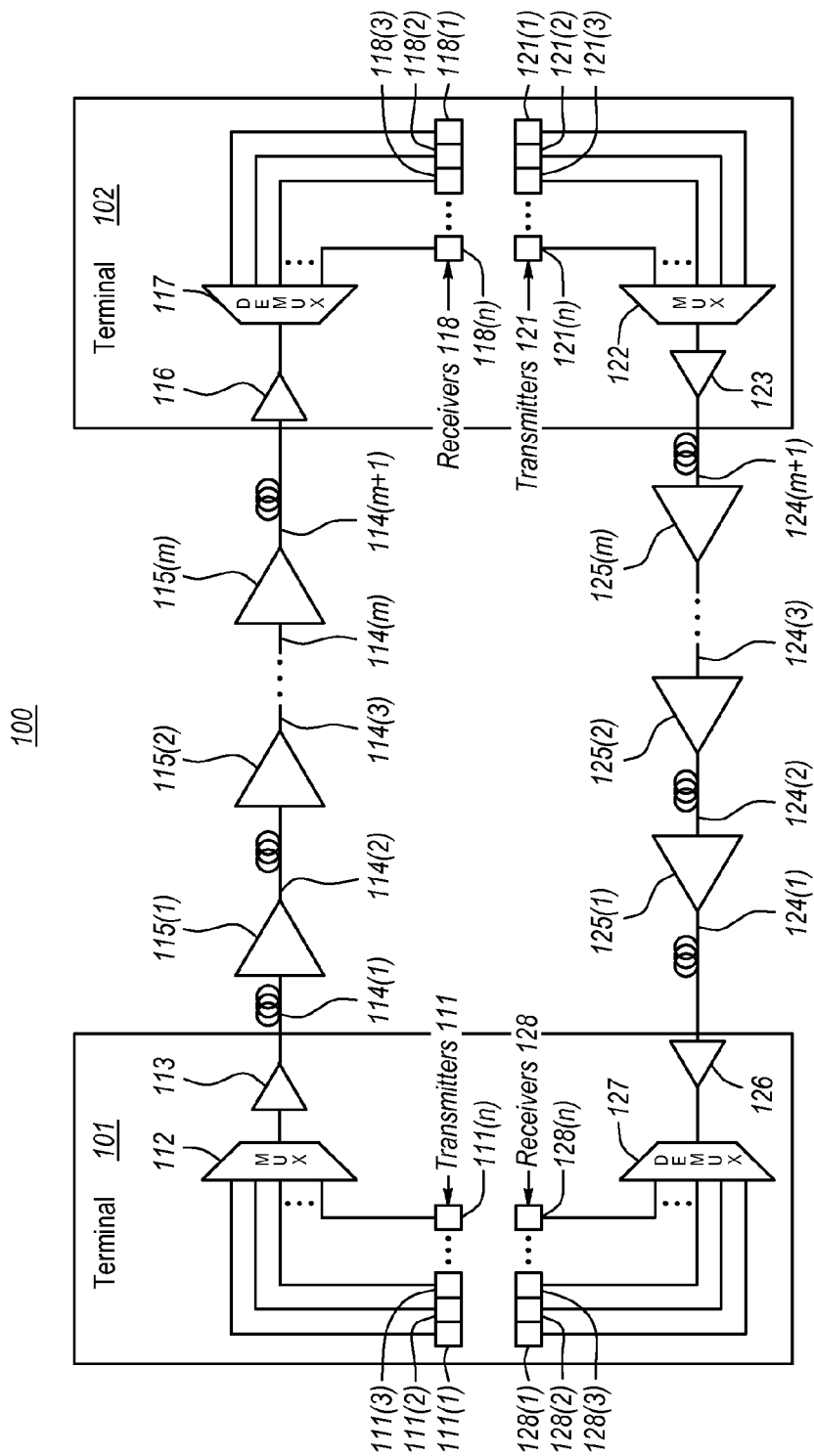
FIG. 1 schematically illustrates an example optical communications system in which the principles described herein may be employed.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". Thus, the optical communications system 100 includes an eastern optical communications link leading from the terminal 101 to the terminal 102, and a western optical communications link leading from the terminal 102 to the terminal 101.

The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "optical wavelength channels". Each optical wavelength channel is allocated a particular frequency for optical communication. Signals that fall within the particular frequency will be referred to as respective optical wavelength signals. Accordingly, in order to communicate using WDM or DWDM optical signals over the eastern optical communications link, the terminal 101 may have "n" optical transmitters 111 (including optical transmitters 111(1) through 111(n), where n is a positive integer), each optical transmitter for transmitting over a corresponding eastern optical wavelength channel. Likewise, in order to communicate over the western optical link, the terminal 102 may have "n" optical transmitters 121 including optical transmitters 121(1) through 121(n), each also for transmitting over a corresponding western optical wavelength channel.

The principles described herein are not limited, however, to communications in which the number of eastern optical wavelength channels is the same as the number of western optical wavelength channels. Furthermore, the principles described herein are not limited to the precise structure of the each of the optical transmitters. However, lasers are an appropriate optical transmitter for transmitting at a particular frequency. That said, the optical transmitters may each even be multiple laser transmitters, and may be tunable within a frequency range.

As for the eastern channel for optical transmission in the eastern direction, the terminal 101 multiplexes each of the eastern optical wavelength signals from the optical transmitters 111 into a single eastern optical signal using optical multiplexer 112, which may then be optically amplified by an optional eastern optical amplifier 113 prior to being transmitted onto a first optical fiber communications span 114(1).

There are a total of "m" repeaters 115 and "m+1" optical fiber communications spans 114 between the terminals 101 and 102 in each of the eastern and western optical communications links. However, there is no requirement for the number of repeaters in each of the eastern and western optical communications links to be equal. In an unrepeatered optical communication system, "m" would be zero such that there is but a single optical fiber communications span 114(1) and no repeaters between the terminals 101 and 102. In a repeatered optical communications system, "m" would be one or greater. Each of the repeaters, if present, may consume electrical power to thereby amplify the optical signals.

The eastern optical signal from the final optical fiber communications span 114(m+1) is then optionally amplified at the terminal 102 by the optional optical amplifier 116. The eastern optical signal is then demultiplexed into the various wavelength optical wavelength channels using optical demultiplexer 117. The various optical wavelength channels may then be received and processed by corresponding optical receivers 118 including receivers 118(1) through 118(n).

As for the western channel for optical transmission in the western direction over the western optical communications link, the terminal 102 multiplexes each of the western optical wavelength signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first optical fiber communications span 124(m+1). If the western optical channel is symmetric with the eastern optical channel, there are once again "m" repeaters 125 (labeled 125(1) through 125(m)), and "m+1" optical fiber communications spans 124 (labeled 124(1) through 124(m+1)). Recall that in an unrepeatered environment, "m" may be zero such that there is only one optical fiber communications span 124(1) and no repeaters 125 in the western channel.

The western optical signal from the final optical fiber communications span 124(1) is then optionally amplified at the terminal 101 by the optional optical amplifier 126. The western optical signal is then demultiplexed using optical demultiplexer 127, whereupon the individual wavelength division optical channels are received and processed by the receivers 128 (including receivers 128(1) through 128(n)). Terminals 101 and/or 102 do not require all the elements shown in optical communication system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeatered system) for high-quality single mode fiber might be about 50 kilometers, and in practice may range from 30 kilometers or less to 100 kilometers or more. That said, the principles described herein are not limited to any particular optical path distances between repeaters, nor are they limited to repeater systems in which the optical path distances are the same from one repeatered segment to the next.

The optical communications system 100 is represented in simplified form for purpose of illustration and example only. The principles described herein may extend to much more complex optical communications systems. The principles described herein may apply to optical communication systems in which there are multiple fiber pairs, each for communicating multiplexed WDM optical signals. Furthermore, the principles described herein also apply to optical communications in which there are one or more branching nodes that split one or more fiber pairs and/or optical wavelength channels in one direction, and one or more fiber pairs and/or optical wavelength channels in another direction.

Figure 2:
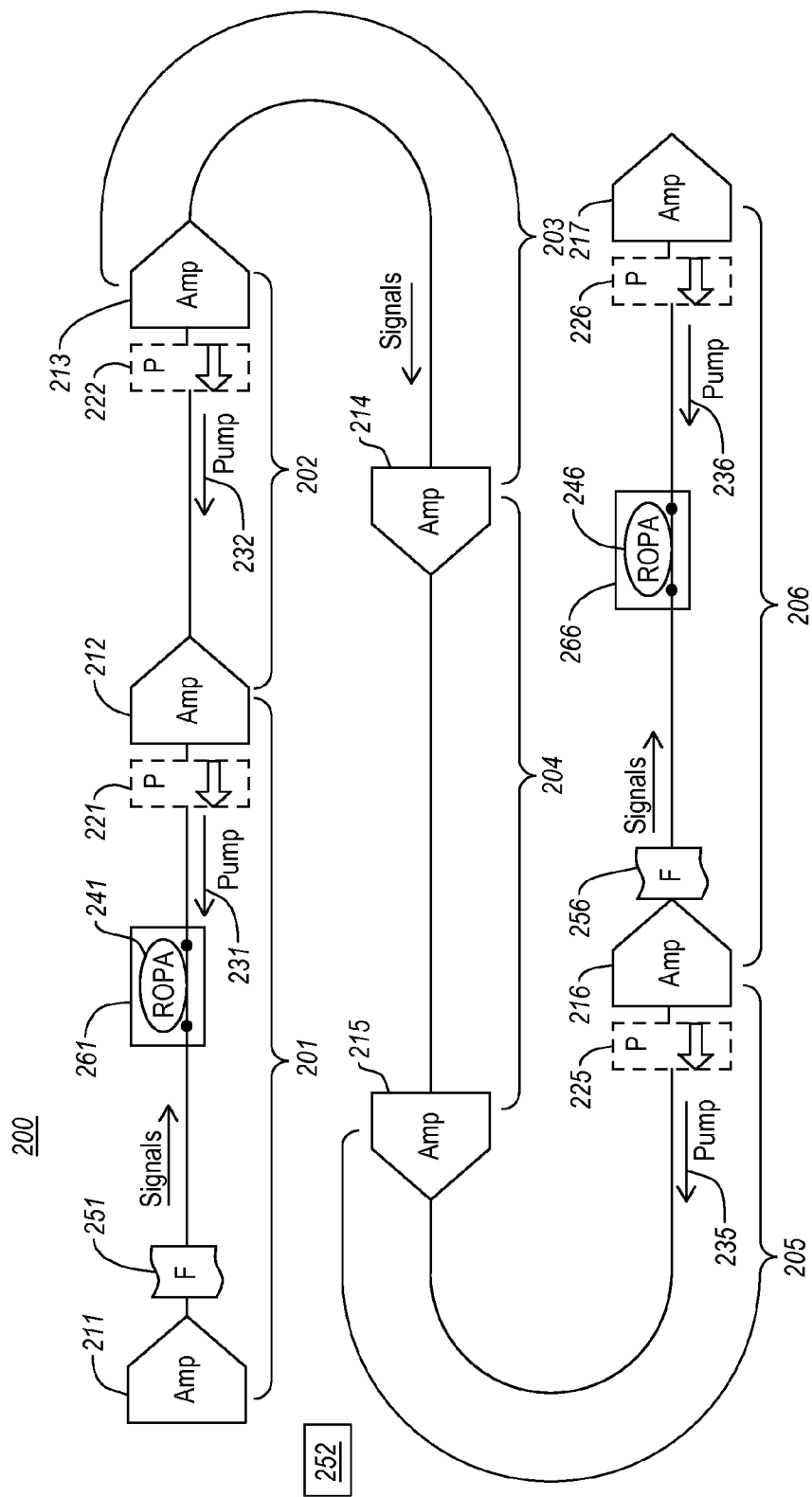
FIG. 2 schematically illustrates a multi-span optical communications link in which remote optically pumped amplifiers are utilized in more than one optical communications spans.

FIG. 2 illustrates an optical communications link 200 that represents an example of one of the optical communications links of FIG. 1. The optical communications link 200 might be the eastern optical communications link or the western optical communications link of FIG. 1. There are six optical communications spans 201 through 206 illustrated in FIG. 2 (i.e., "m" would equal 5 in this example optical communications span 200). This is for purposes of illustration only, as the principles described herein may apply to any multi-span optical communications link. There are powered amplifiers bordering each optical communications span. Thus, with there being six optical communications spans in this example, there are seven powered amplifiers 211 through 217.

The powered amplifiers 211 and 217 are incorporated in terminals. For instance, if the optical communications link 200 is the eastern optical communications link of FIG. 1, then the amplifier 211 is incorporated within the terminal 101 of FIG. 1 (such as the amplifier 113 of FIG. 1), and the amplifier 217 is incorporated within the terminal 102 of FIG. 1 (such as the amplifier 116 of FIG. 1). On the contrary, if the optical communications link 200 is the western optical communications link of FIG. 1, then the amplifier 211 is incorporated within the terminal 102 of FIG. 1 (such as the amplifier 123 of FIG. 1), and the amplifier 217 is incorporated within the terminal 101 of FIG. 1 (such as the amplifier 126 of FIG. 1).

The powered amplifiers 212 through 216, on the other hand, are incorporated within repeaters. For instance, if the optical communications link 200 is the eastern optical communications link of FIG. 1, then the amplifiers 212 through 216 would be incorporated within repeaters 115(1) through 115(5) respectively, with "m" being equal to 5 in FIG. 1. On the other hand, if the optical communications link 200 is the western optical communications link of FIG. 1, then the amplifiers 212 through 216 would be incorporated within repeaters 125(5) through 125(1), respectively.

In accordance with the principles described herein, one or more of the optical communications spans has incorporated a backwards Raman pump module. For instance, in the example of FIG. 2, four of the optical communications spans have a backward Raman pump module. Specifically, the optical communications spans 201, 202, 205 and 206 each have respective Raman pump modules 221, 222, 225 and 226 that respective backward Raman pump power 231, 232, 235 and 236 that counter-propagates against the optical signals and thus provides distributed backward Raman amplification of the optical signal within the respective optical communications spans.

In accordance with the principles described herein, each of at least one of the optical communications spans that has a corresponding backwards Raman pump module also has incorporated therein a remote optically pumped amplifier (ROPA) that receives a residual amount of backwards Raman pump power to thereby perform discrete optical amplification of the optical signal. For instance, in FIG. 2, the optical communications span 201 includes a remote optical pumped amplifier 241 that receives a residual amount of backwards Raman pump power 231 to thereby perform discrete optical amplification of the optical signal. In addition, the optical communications span 206 includes a remote optical pumped amplifier 246 that receives a residual amount of backwards Raman pump power 236 to thereby perform discrete optical amplification of the optical signal.

In one embodiment, one or more of the remote optically pumped amplifiers is positioned from 40 to 120 kilometers in optical distance from the backwards Raman pump module and receives at least three milliwatts of backwards Raman pump power from the corresponding backward Raman pump module. These parameters provide reasonably good likelihood that there is sufficient residual Raman pump power such that the remote optically pumped amplifier can still efficiently convert that power into amplification of the optical signal, while still permitting the remote optically pumped amplifier to provide significant additional distance in the optical communications span.

Whereas traditional remote optically pumped amplifiers are conventionally supplied by a single pump backwards Raman pump module (in which the wavelength of the pump optics is approximately 1480 nanometers), one or more of the backwards Raman pump modules of the optical communications link might be multi-pump modules. For instance, one or more of the Raman pump modules 221 and 226 may be multi-pump modules. The remainder of the Raman pump modules 222 and 225 may likewise be multi-pump modules.

Such multi-pump modules may more evenly perform backwards Raman amplification within the optical communications span across all frequencies of optical wavelength signals. However, the residual backwards Raman pump power received at the remote optically pumped amplifier might still be predominantly the same wavelength. This is because higher frequency pumps can be converted into lower frequency pumps also due to the principle of Raman conversion. The multi-pump Raman conversion results in higher pump power in the lower frequency pump at the ROPA than would be the case if there were only a single pump at lower frequency. Accordingly, the remote optically pumped amplifier, which is designed for most suitable amplification at that wavelength, may still operate efficiently. In one embodiment, a backwards Raman pump module comprises at least four distinct pump wavelengths with the longest pump wavelength being between 1470 and 1510 nanometers.

A filter may be provided to at least partially compensate for signal gain variation versus wavelength of the combined remote optically pumped amplifier and the backwards Raman pump module. For instance, the filter 251 may at least partially compensate for signal gain variation caused by the remote optically pumped amplifier 241 and the backwards Raman amplification caused by the backwards Raman pump 221 within the optical communications span 201. In addition, the filter 256 may at least partially compensate for signal gain variation caused by the remote optically pumped amplifier 246 and the backwards Raman amplification caused by the backwards Raman pump 226 within the optical communications span 206. Alternatively, one the optical filters 251 and 256 may be omitted, thereby relying on the other filter to at least partially compensate for signal gain variety caused by both sets of remote optically pumped amplifiers and backwards Raman pump modules. Alternatively, optical filters 251 or 256 may at least partially compensate for the signal gain variation caused by other elements in communications link 200. Optical filters 251 and 256 may have a fixed spectral shape or may be dynamic which allows the spectral shape to be adjusted electronically.

The filter may be located within the remote optically pumped amplifier, or may be located within a powered node on either side of the optical communications span. For instance, the filter 251 may be located within the same assembly as the remote optically pumped amplifier 241, or may be located within the same assembly as the amplifier 211 or the amplifier 212. Likewise, the filter 256 may be located within the same assembly as the remote optically pumped amplifier 246, or may be located within the same assembly as the amplifier 216 or the amplifier 217.

The optical communications link 200 may be a terrestrial optical communications link, in which all of the optical communications spans 201 through 206 are terrestrial optical communications spans. Alternatively, the optical communications link 200 may be a submarine optical communications link, in which all of the optical communications spans 201 through 206 are submarine optical communications spans. The optical communications link 200 may also be a hybrid in which one or more of the optical communications spans 201 through 206 are terrestrial optical communications spans, and one or more of the optical communications spans 201 through 206 are submarine optical communications spans.

However, in some embodiments, the optical communications spans 201 and 206 are terrestrial optical communications spans. In this case, the remote optically pumped amplifiers 241 and 246 are located terrestrially in a non-submarine environment. The remote optically pumped amplifiers 241 through 246 may perhaps even be located within respective splice box 261 and 266, which are normally used to protect splices of the optical fibers. For instance, optical fibers normally come in lengths of several kilometers. Thus, in order to connect optical fibers of tens or hundreds of kilometers, there are periodically splices in the optical fiber. Splice boxes typically are provided to protect the areas where one optical fiber is spliced to meet another optical fiber. Such splice boxes may be used to fit also the remote optically pumped amplifier. In some embodiments, enclosures 261 and 266 only house the remote optically pumped amplifiers and do not house span fiber splices.

Figure 3:
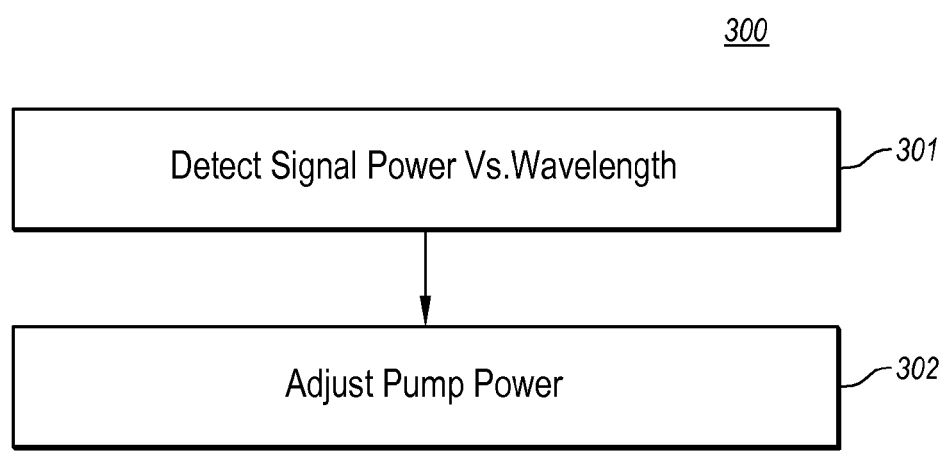
FIG. 3 illustrates a flowchart of a method for controlling optical signal power versus wavelength in a multi-span optical communications link.

The optical communications system 200 further includes a controller 252. FIG. 3 illustrates a flowchart of a method 300 for controlling optical signal power versus wavelength in a multi-span optical communications link. The controller 252 may perform the method 300 of FIG. 3, by first detecting optical signal power wavelength variation versus wavelength at a node in the optical communications span (act 301). The controller 252 then adjusts the pump power of at least one pump of a multi-pump backward Raman pump module that provides backwards Raman pump power (act 302). For instance, the controller 252 might adjust the pump power of one of the pumps in backwards Raman pump module 221, 222, 225 and 226. This feedback pattern may be continued to provide more uniform gain across all optical wavelength signals within the optical communications link, despite the presence of remote optically pumped amplifier(s) and backward Raman amplification.

As an example, the controller 252 may monitor optical signal power versus wavelength at the assembly that contains the amplifier 212 (or any other node or amplifier downstream in the optical communications link 200 such as amplifiers 213 through 217), and adjust the pump power of one or more pumps of the backwards Raman pump module 221 accordingly. The controller 252 may monitor optical signal power versus wavelength at the assembly that contains the amplifier 217, and adjust the pump power of one or more pumps of the backwards Raman pump module 226 accordingly.

Thus, an effective mechanism for incorporating remote optically pumped amplifiers into a multi-span optical communications link has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical communications link comprising:
    a plurality of optical communications spans comprising:
        a first communications span comprising:
            a backwards Raman pump module;
            a remote optically pumped amplifier positioned from 40 to 120 kilometers in optical distance from the backwards Raman pump module, the remote optically pumped amplifier configured to receive at least three milliwatts of backwards Raman pump power from the backwards Raman pump module; and
            a filter configured to at least partially compensate for signal gain variation versus wavelength of the remote optically pumped amplifier and the backwards Raman pump module; and
        a second communications span.

2. The optical communications link in accordance with claim 1, wherein the backwards Raman pump module comprises a multi-pump backwards Raman pump module.

3. The optical communications link in accordance with claim 2, wherein the multi-pump backwards Raman pump module is configured to generate backwards Raman pump power at four or more distinct pump wavelengths with a longest pump wavelength being between 1470 and 1510 nanometers.

4. The optical communications link in accordance with claim 1, wherein the remote optically pumped amplifier is positioned terrestrially.

5. The optical communications link in accordance with claim 1, wherein the remote optically pumped amplifier is positioned within a splice protector box.

6. The optical communications link in accordance with claim 1, wherein:
    the backwards Raman pump module is a first backwards Raman pump module; and the second communications span comprises a second backwards Raman pump module.

7. The optical communications link in accordance with claim 6, wherein:
the remote optically pumped amplifier is a first remote optically pumped amplifier; and
the second communications span further comprises a second remote optically pumped amplifier positioned from 40 to 120 kilometers in optical distance from the second backwards Raman pump module, the second remote optically pumped amplifier configured to receive at least three milliwatts of backwards Raman pump power from the second backwards Raman pump module.

8. The optical communications link in accordance with claim 2, wherein:
the multi-pump backwards Raman pump module is configured to generate backwards Raman pump power at multiple distinct pump wavelengths including one or more higher pump wavelengths and one or more lower pump wavelengths; and
the first communications span is configured to convert backwards Raman pump power at the one or more higher pump wavelengths to backwards Raman pump power at the one or more lower pump wavelengths so that the backwards Raman pump power received at the remote optically pumped amplifier is predominantly at the one or more lower pump wavelengths.

9. The optical communications link in accordance with claim 1, wherein the filter is located within the remote optically pumped amplifier.

10. The optical communications link in accordance with claim 1, wherein the filter is located within a node on one side of the first communications span.

11. The optical communications link in accordance with claim 8, wherein:
the backwards Raman pump module is a first backwards Raman pump module; and
the second communications span comprises a second backwards Raman pump module.

12. The optical communications link in accordance with claim 11, wherein:
the remote optically pumped amplifier is a first remote optically pumped amplifier; and
the second communications span further comprises a second remote optically pumped amplifier positioned from 40 to 120 kilometers in optical distance from the second backwards Raman pump module, the second remote optically pumped amplifier configured to receive at least three milliwatts of backwards Raman pump power from the second backwards Raman pump module.

13. The optical communications link in accordance with claim 1, further comprising:
a controller configured to control the backwards Raman pump power of the backwards Raman pump module.

14. The optical communications link in accordance with claim 13, wherein the controller is configured to control the backwards Raman pump power based on signal power detected at a node containing the backwards Raman pump module.

15. A method for controlling optical signal power versus wavelength in a multi-span optical communications link, the method comprising:
detecting optical signal versus power at a node in the optical communications link;
adjusting a pump power of at least one pump of a multi-pump backwards Raman pump module that (i) provides Raman amplification in an optical communications span of the multi-span optical communications link and (ii) powers a remote optically pumped amplifier in the optical communications span; and
using a filter, at least partially compensating for signal gain variation versus wavelength of the remote optically pumped amplifier and the Raman amplification;
wherein the remote optically pumped amplifier is positioned from 40 to 120 kilometers in optical distance from the multi-pump backward Raman pump module; and
wherein the remote optically pumped amplifier receives at least three milliwatts of backwards Raman pump power from the multi-turn backward Raman pump module.

16. The method of claim 15, wherein the multi-pump backwards Raman pump module is configured to generate backwards Raman pump power at four or more distinct pump wavelengths with a longest pump wavelength being between 1470 and 1510 nanometers.

17. The method of claim 15, wherein:
the multi-pump backwards Raman pump module is configured to generate backwards Raman pump power at multiple distinct pump wavelengths including one or more higher pump wavelengths and one or more lower pump wavelengths; and
the optical communications span is configured to convert backwards Raman pump power at the one or more higher pump wavelengths to backwards Raman pump power at the one or more lower pump wavelengths so that the backwards Raman pump power received at the remote optically pumped amplifier is predominantly at the one or more lower pump wavelengths.

18. An optical communications span comprising:
a backwards Raman pump module;
a remote optically pumped amplifier positioned from 40 to 120 kilometers in optical distance from the backwards Raman pump module, the remote optically pumped amplifier configured to receive at least three milliwatts of backwards Raman pump power from the backwards Raman pump module; and
a filter configured to at least partially compensate for signal gain variation versus wavelength of the remote optically pumped amplifier and the backwards Raman pump module.

19. The optical communications span of claim 18, wherein:
the backwards Raman pump module is configured to generate backwards Raman pump power at multiple distinct pump wavelengths including one or more higher pump wavelengths and one or more lower pump wavelengths; and
the optical communications span is configured to convert backwards Raman pump power at the one or more higher pump wavelengths to backwards Raman pump power at the one or more lower pump wavelengths so that the backwards Raman pump power received at the remote optically pumped amplifier is predominantly at the e one or more lower pump wavelengths.

20. The optical communications span in accordance with claim 18, wherein the filter is located within the remote optically pumped amplifier.

* * * * *